(12) United States Patent
Kim et al.

(10) Patent No.: US 12,013,094 B2
(45) Date of Patent: Jun. 18, 2024

(54) LIGHTING DEVICE FOR VEHICLE

(71) Applicant: HYUNDAI MOBIS CO., LTD., Seoul (KR)

(72) Inventors: Do Hyung Kim, Yongin-si (KR); Seung Woo Baek, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/219,849

(22) Filed: Jul. 10, 2023

(65) Prior Publication Data

US 2024/0019096 A1    Jan. 18, 2024

(30) Foreign Application Priority Data

Jul. 12, 2022 (KR) .................. 10-2022-0085959

(51) Int. Cl.
| | |
|---|---|
| *F21S 41/265* | (2018.01) |
| *F21S 41/147* | (2018.01) |
| *F21V 14/02* | (2006.01) |
| *F21Y 115/10* | (2016.01) |

(52) U.S. Cl.
CPC .......... *F21S 41/265* (2018.01); *F21S 41/147* (2018.01); *F21V 14/02* (2013.01); *F21Y 2115/10* (2016.08)

(58) Field of Classification Search
CPC ...... F21S 41/265; F21S 41/147; F21S 41/657; B60Q 1/2661; B60Q 1/076; B60Q 1/08; B60Q 1/085; B60Q 1/28; F21V 14/02
See application file for complete search history.

(56) References Cited

U.S. PATENT DOCUMENTS

2019/0106047 A1*  4/2019  Hartenstein ............. F21S 41/50
2019/0202337 A1*  7/2019  Kurebayashi .......... B60Q 1/085

FOREIGN PATENT DOCUMENTS

JP          7095131 B1 *  7/2022  .............. F21S 41/25
KR   10-0311953 B1     4/2002

* cited by examiner

*Primary Examiner* — Karabi Guharay
(74) *Attorney, Agent, or Firm* — Morgan, Lewis & Bockius LLP (57) ABSTRACT

A lighting device for a vehicle includes a center body unit, a driving lens unit disposed on first and second sides of the center body unit and configured to provide driving lighting, a grill lens unit disposed between the center body unit and the driving lens unit and configured to provide grill lighting, and a light source unit configured to selectively emit light to the driving lens unit and the grill lens unit.

20 Claims, 6 Drawing Sheets

LIGHTING DEVICE FOR VEHICLE

CROSS-REFERENCE TO RELATED APPLICATION

This application claims priority from and the benefit of Korean Patent Application No. 10-2022-0085959, filed on Jul. 12, 2022, which is hereby incorporated by reference for all purposes as if set forth herein.

BACKGROUND

Field

Exemplary embodiments of the present disclosure relate to a lighting device for a vehicle, and more particularly, to a lighting device for a vehicle that can selectively implement driving lighting and dynamic grill lighting by using one light source.

Discussion of the Background

In general, a headlight designed in a vehicle is fixedly installed to emit light onto a road in front of the vehicle, and is turned on during night driving to ensure a driver's field of view. Recently, such a headlight is turned on even in the daytime to induce safe driving by vehicle recognition.

However, in the related art, since the emission angle of the headlight is fixed, separate lighting means needs to be installed in order to implement communication lighting signal, welcome and goodbye motion lighting, and the like, in addition to a lighting lamp. Therefore, demands for solving the above problem are required.

The background art of the present disclosure is disclosed in Korea Patent No. 10-0311953 (registered on Oct. 4, 2001 and entitled "Assistance Lamp of a Car").

SUMMARY

Various embodiments are directed to a lighting apparatus for a vehicle that can selectively implement driving lighting and dynamic grill lighting by using one light source.

In an embodiment, a lighting apparatus for a vehicle includes: a center body unit; a driving lens unit disposed on first and second sides of the center body unit and configured to provide driving lighting; a grill lens unit disposed between the center body unit and the driving lens unit and configured to provide grill lighting; and a light source unit configured to selectively emit light to the driving lens unit and the grill lens unit.

The driving lens unit may include: a first driving lens portion exposed to the outside thereof; and a second driving lens portion configured to extend backward from the first driving lens portion to surround the light source unit, to transmit the light emitted from the light source unit, and to guide the light to the grill lens unit.

The driving lens unit may further include a third driving lens portion disposed inside the first driving lens portion and configured to prevent an inside of the first driving lens portion from being visible to the naked eye.

The third driving lens portion may include an opaque material and may be mounted or coated inside the first driving lens portion.

The grill lens unit may provide grill lighting for communication in an autonomous driving mode of the vehicle.

The grill lens unit may provide motion lighting for welcome or goodbye to a driver.

The grill lens unit may include: a first grill lens portion disposed between the center body unit and the driving lens unit to transmit light; and a second grill lens portion disposed inside the first grill lens portion and configured to allow a part of the light provided from the light source unit to pass therethrough.

In the second grill lens portion, a second blocking portion that blocks light in a left and right lateral direction and a second transmission portion that transmits light may be alternately disposed.

The grill lens unit may further include a fourth grill lens portion coated on the first grill lens portion and configured to transmit light and to have a color corresponding to a color of the center body unit.

The grill lens unit may include: a first grill lens portion disposed between the center body unit and the driving lens unit to transmit light; and a third grill lens portion disposed outside the first grill lens portion and configured to allow a part of the light transmitting the first grill lens portion to pass therethrough.

In the third grill lens portion, a third blocking portion that blocks light in a left and right lateral direction and a third transmission portion that transmits light may be alternately disposed.

The grill lens unit may further include a fourth grill lens portion coated on the first grill lens portion and configured to transmit light and to have a color corresponding to a color of the center body unit.

The light source unit may include: a light generation portion configured to generate the light when power is applied; a light connection portion coupled to the light generation portion; and a light rotation portion configured to rotate the light connection portion so that the light generation portion emits the light to the driving lens unit or emits the light to the grill lens unit.

In the light generation portion, a plurality of LED lamps may be disposed vertically.

When the light generation portion is rotated to emit light to the driving lens unit by the light rotation portion, driving lighting may be provided.

When the light generation portion is rotated to emit light to the grill lens unit by the light rotation portion, grill lighting may be provided.

The light source unit may further include a light cover portion mounted outside the light generation portion and configured to prevent an inside of the first driving lens portion from being visible to the naked eye.

In an embodiment, a lighting apparatus for a vehicle includes: a driving lens unit configured to provide driving lighting; a grill lens unit disposed adjacent to the driving lens unit and configured to provide grill lighting; and a light source unit configured to selectively emit light to the driving lens unit and the grill lens unit.

The light source unit may include: a light generation portion configured to generate the light when power is applied; a light connection portion coupled to the light generation portion; and a light rotation portion configured to rotate the light connection portion so that the light generation portion emits the light to the driving lens unit or emits the light to the grill lens unit.

The light source unit may further include a light cover portion mounted outside the light generation portion and configured to prevent an inside of the first driving lens portion from being visible to the naked eye.

According to a lighting apparatus for a vehicle in accordance with the present disclosure, a light source unit may selectively emit light to a driving lens unit and a grill lens unit disposed consecutively while being rotated, thereby providing driving lighting and grill lighting.

DETAILED DESCRIPTION OF THE ILLUSTRATED EMBODIMENTS

Hereinafter, a lighting device for a vehicle in accordance with the present disclosure will be described with reference to the accompanying drawings through various exemplary embodiments. In this process, the thicknesses of lines or the sizes of elements illustrated in the drawings may be exaggerated for the purpose of clarity and convenience of explanation. Furthermore, terms to be described later are terms defined in consideration of functions thereof in the present disclosure and may be changed according to the intention of a user or an operator, or practice. Accordingly, such terms should be defined based on the disclosure over the present specification.

Figure 1:
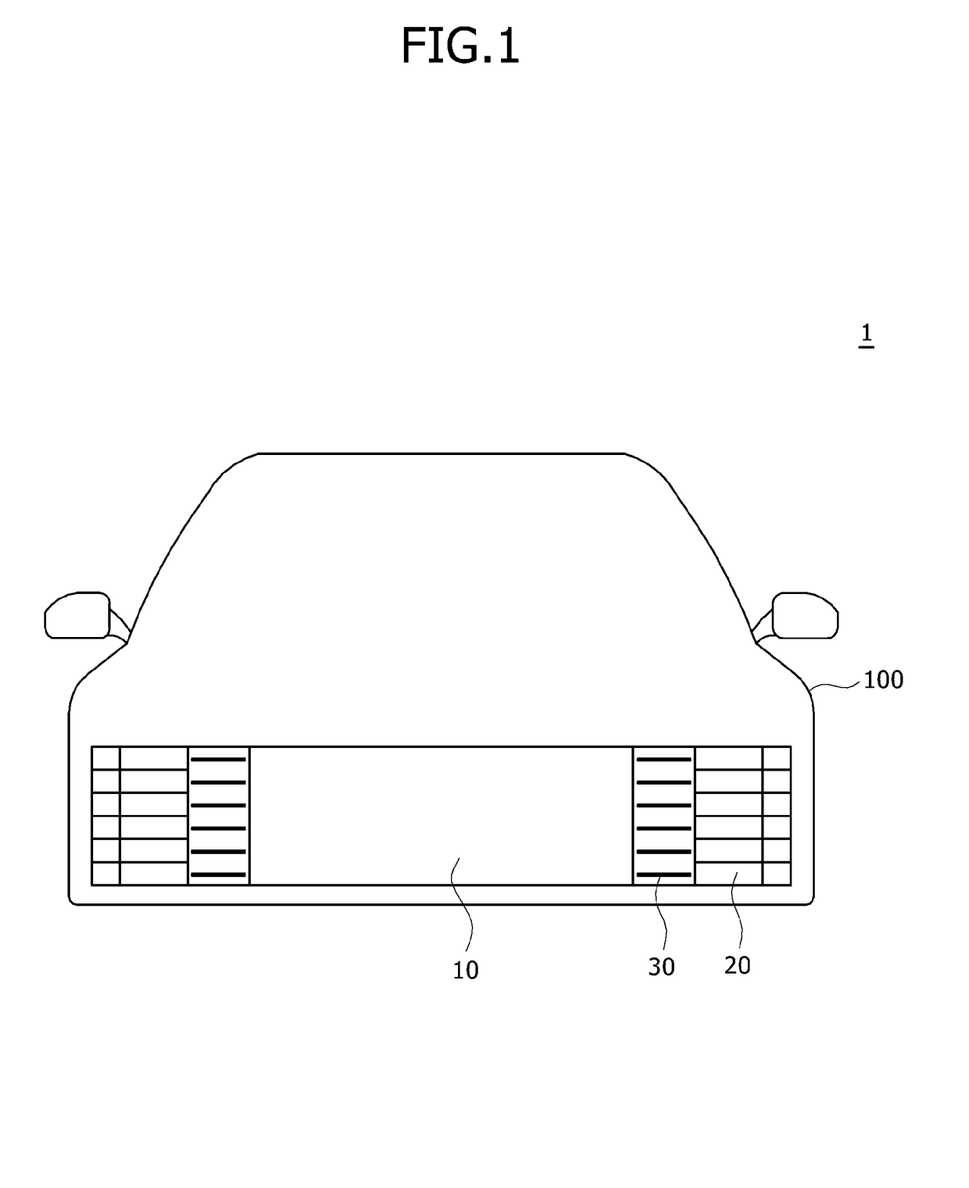
FIG. 1 is a diagram schematically illustrating a lighting device for a vehicle in accordance with an embodiment of the present disclosure.
Figure 2:
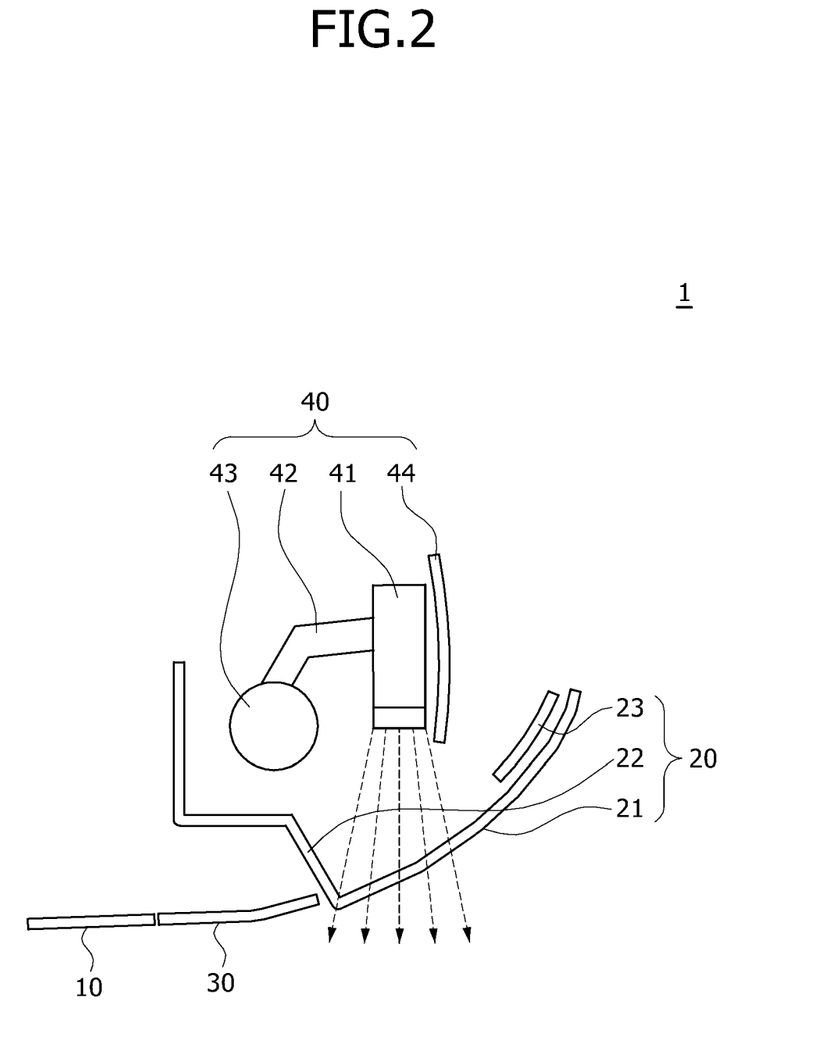
FIG. 2 is a diagram schematically illustrating a state in which driving lighting is implemented in accordance with an embodiment of the present disclosure.
Figure 3:
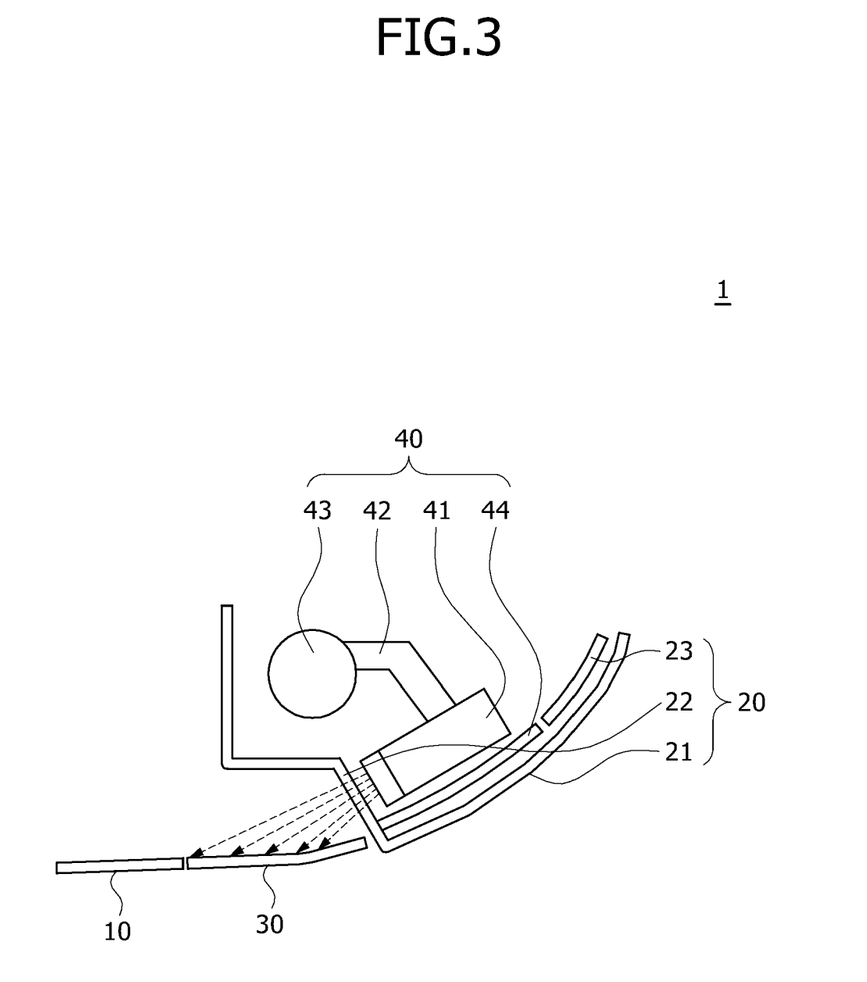
FIG. 3 is a diagram schematically illustrating a state in which grill lighting is implemented in accordance with an embodiment of the present disclosure.

FIG. 1 is a diagram schematically illustrating a lighting device 1 for a vehicle in accordance with an embodiment of the present disclosure, FIG. 2 is a diagram schematically illustrating a state in which driving lighting is implemented in accordance with an embodiment of the present disclosure, and FIG. 3 is a diagram schematically illustrating a state in which grill lighting is implemented in accordance with an embodiment of the present disclosure. Referring to FIGS. 1 to 3, the lighting device 1 for a vehicle in accordance with an embodiment of the present disclosure includes a center body unit 10, a driving lens unit 20, a grill lens unit 30, and a light source unit 40.

The center body unit 10 may be disposed at the central portion of the front surface of a vehicle body 100. In the case of an internal combustion engine vehicle, a radiator for cooling an engine may be disposed inside the center body unit 10, and the center body unit 10 may be formed with a hole for allowing air to pass therethrough.

The driving lens unit 20 may be disposed on both sides of the center body unit 10, and may provide driving lighting. The driving lens unit 20 may be mounted on the vehicle body 100 and spaced apart from the center body unit 10. In such a case, the driving lighting is lighting for inducing the securing of a driver's field of view during night or daytime driving, and may be implemented by low and high beams.

The grill lens unit 30 may be disposed between the center body unit 10 and the driving lens unit 20, and may provide grill lighting. The grill lens unit 30 may be connected to one or more of the vehicle body 100, the center body unit 10, and the driving lens unit 20. In such a case, the grill lighting may be provided in the left and right lateral direction of the vehicle body 100. The grill lighting may be used for communication in an autonomous driving mode or provide motion lighting for welcome or goodbye to a driver.

The light source unit 40 may selectively emit light to the driving lens unit 20 and the grill lens unit 30. In the light source unit 40, a plurality of LED lamps may be disposed vertically, upper LED lamps may be used as low beams, and lower LED lamps may be used as high beams. Such an LED lamp may emit light to the driving lens unit 20, or emit light to the grill lens unit 30.

The lighting device 1 for a vehicle in accordance with another embodiment of the present disclosure may be disposed at various points in rear, side portions, and front portion of the vehicle, and may provide lighting. That is, the lighting device 1 for a vehicle in accordance with another embodiment of the present disclosure includes the driving lens unit 20, the grill lens unit 30, and the light source unit 40. The driving lens unit 20, the grill lens unit 30, and the light source unit 40 are not limited to both sides of the center body unit 10 and may be disposed at various points in the vehicle.

The driving lens unit 20 in accordance with an embodiment of the present disclosure may include a first driving lens portion 21 and a second driving lens portion 22.

The first driving lens portion 21 may be exposed to the outside. For example, the first driving lens portion 21 may be mounted on the vehicle body 100 and connected to the adjacent grill lens unit 30. The first driving lens portion 21 may be made of a material capable of transmitting light.

The second driving lens portion 22 may extend backward from the first driving lens portion 21 and surround the light source unit 40. The second driving lens portion 22 may transmit light emitted from the light source unit 40 and guide the light to the grill lens unit 30. The second driving lens portion 22 may extend from one end of the first driving lens portion 21 to partition a space where the light source unit 40 is disposed. In addition, the second driving lens part 22 may extend from both ends of the first driving lens portion 21 to cover the light source unit 40. A part of the second driving lens portion 22 may transmit light and the rest thereof may block light.

The driving lens unit 20 in accordance with an embodiment of the present disclosure may further include a third driving lens portion 23. The third driving lens portion 23 may be disposed inside the first driving lens portion 21 and may prevent the inside of the first driving lens portion from being visible to the naked eye. The third driving lens portion 23 may include an opaque material and may be mounted or coated inside the first driving lens portion 21.

The light source unit 40 in accordance with an embodiment of the present disclosure may include a light generation portion 41, a light connection portion 42, and a light rotation portion 43.

The light generation portion 41 may generate light when power is applied. In the light generation portion 41, a plurality of LED lamps may be disposed vertically, some LED lamp may serve as low beams, and the other LED lamps may serve as high beams.

The light connection portion 42 may be coupled to the light generation portion 41. One end of the light connection portion 42 may be coupled to the light generation portion 41 and the other end of the light connection portion 42 may be coupled to the light rotation portion 43. The light connection portion 42 may have a straight, curved, or bent shape according to the design of an internal space of the driving lens unit 20.

The light rotation portion 43 may rotate the light connection portion 42 so that the light generation portion 41 emits light to the driving lens unit 20 or emits light to the grill lens unit 30. The light rotation portion 43 may be rotatably mounted on the vehicle body 100, and the light connection portion 42 may be coupled to the outside of the light rotation portion 43. When the light generation portion 41 is disposed to face the first driving lens portion 21 by the light rotation portion 43, driving lighting may be provided. The meaning that the light generation portion 41 faces the first driving lens portion 21 may represent that the light generation portion 41 emits light to the driving lens unit 20. When the light generation portion 41 is disposed to face the second driving lens portion 22 by the light rotation portion 43, grill lighting may be provided. The meaning that the light generation portion 41 faces the second driving lens portion 22 may represent that the light generation portion 41 emits light to the grill lens unit 30.

The light source unit 40 in accordance with an embodiment of the present disclosure may further include a light cover portion 44. The light cover portion 44 may be mounted on the outside of the light generation portion 41 and prevent the inside of the first driving lens portion 21 from being visible to the naked eye. The light connection portion 42 may be coupled to one side of the light generation portion 41 and the light cover portion 44 may be coupled to the other side of the light generation portion 41. When the light generation portion 41 is rotated for grill lighting, the light cover portion 44 may be disposed to face the first driving lens portion 21 and prevent the inside of the first driving lens portion 21 from being visible from the outside. The light cover portion 44 may be manufactured to have the same material and color as those of the third driving lens portion 23. The first driving lens portion 21 may be formed to have a curvature, and the light cover portion 44 may be formed to have a curvature corresponding to that of the first driving lens portion 21. When the light cover portion 44 restricts the securing of the inner field of view of the first driving lens portion 21, the light cover portion 44 and the third driving lens portion 23 may be disposed consecutively.

Figure 4:
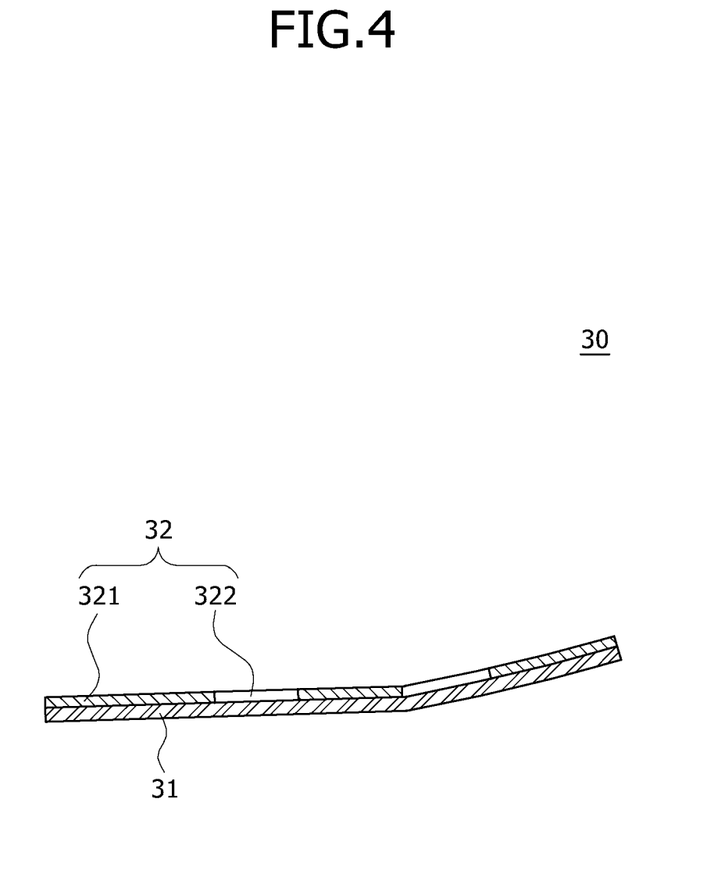
FIG. 4 is a diagram schematically illustrating a grill lens unit in accordance with a first embodiment of the present disclosure.

FIG. 4 is a diagram schematically illustrating the grill lens unit in accordance with a first embodiment of the present disclosure. Referring to FIG. 4, the grill lens unit 30 in accordance with the first embodiment of the present disclosure may include a first grill lens portion 31 and a second grill lens portion 32.

The first grill lens portion 31 may be disposed between the center body unit 10 and the driving lens unit 20 to transmit light. The first grill lens portion 31 may be mounted on the vehicle body 100 and connected to the center body unit 10 and the second driving lens portion 22. The first grill lens portion 31 may be made of a transparent material.

The second grill lens portion 32 may be disposed inside the first grill lens portion 31, and may allow a part of light provided from the light source unit 40 to pass therethrough. The second grill lens portion 32 may be a bezel coupled to the inside of the first grill lens portion 31 or a coating applied to the inside of the first grill lens portion 31. In the second grill lens portion 32, a second blocking portion 321 that blocks light in left and right lateral direction and a second transmission portion 322 that transmits light may be alternately disposed. When the second grill lens portion 32 has a bezel shape, a hole shape of the second grill lens portion 32 may be the second transmission portion 322. When the second grill lens portion 32 is coated on the first grill lens portion 31, a part of the second grill lens portion 32 on which a light blocking material is coated is removed by an etching process, thereby forming the second transmission portion 322.

Figure 5:
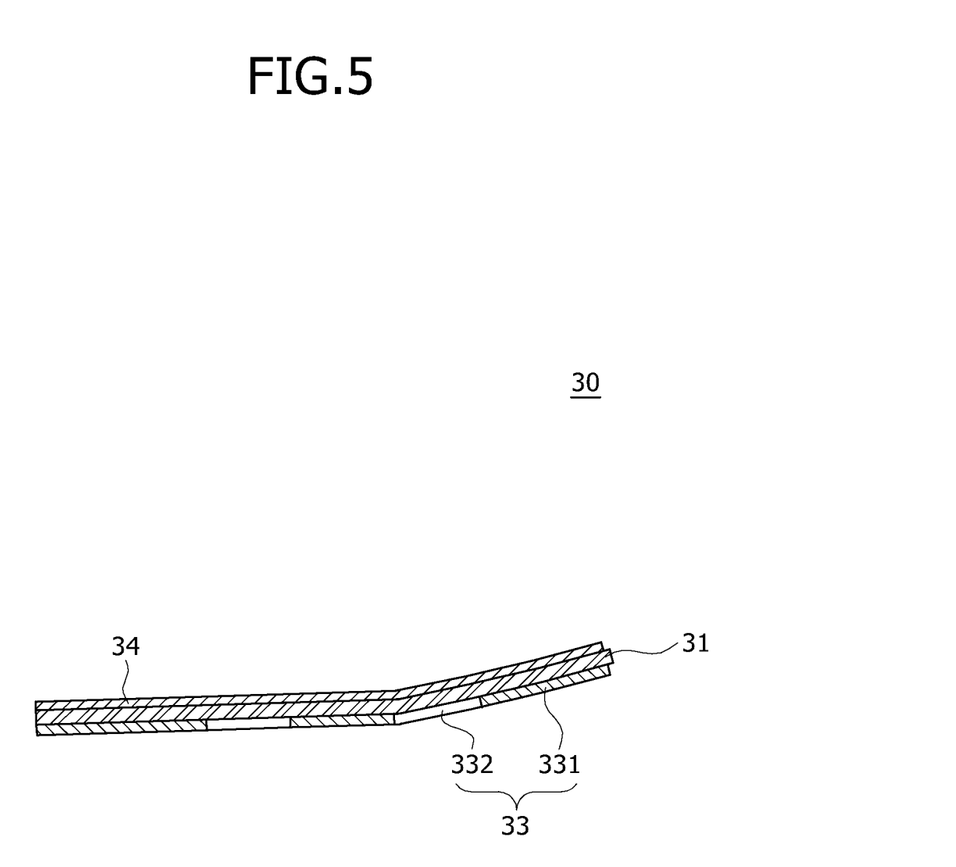
FIG. 5 is a diagram schematically illustrating a grill lens unit in accordance with a second embodiment of the present disclosure.

FIG. 5 is a diagram schematically illustrating the grill lens unit in accordance with a second embodiment of the present disclosure. Referring to FIG. 5, the grill lens unit 30 in accordance with the second embodiment of the present disclosure may include the first grill lens portion 31 and a third grill lens portion 33.

The first grill lens portion 31 may be disposed between the center body unit 10 and the driving lens unit 20 to transmit light. The first grill lens portion 31 may be mounted on the vehicle body 100 and connected to the center body unit 10 and the second driving lens portion 22. The first grill lens portion 31 may be made of a transparent material.

The third grill lens portion 33 may be disposed outside the first grill lens portion 31, and may allow a part of light passing through the first grill lens portion 31 to pass therethrough. The third grill lens portion 33 may be coupled to the vehicle body 100 or may be integrally formed with the vehicle body 100. In the third grill lens portion 33, a third blocking portion 331 that blocks light in the left and right lateral direction and a third transmission portion 332 that transmits light may be alternately disposed. A hole shape in the left and right lateral direction of the third grill lens portion 33 may be the third transmission portion 332.

Figure 6:
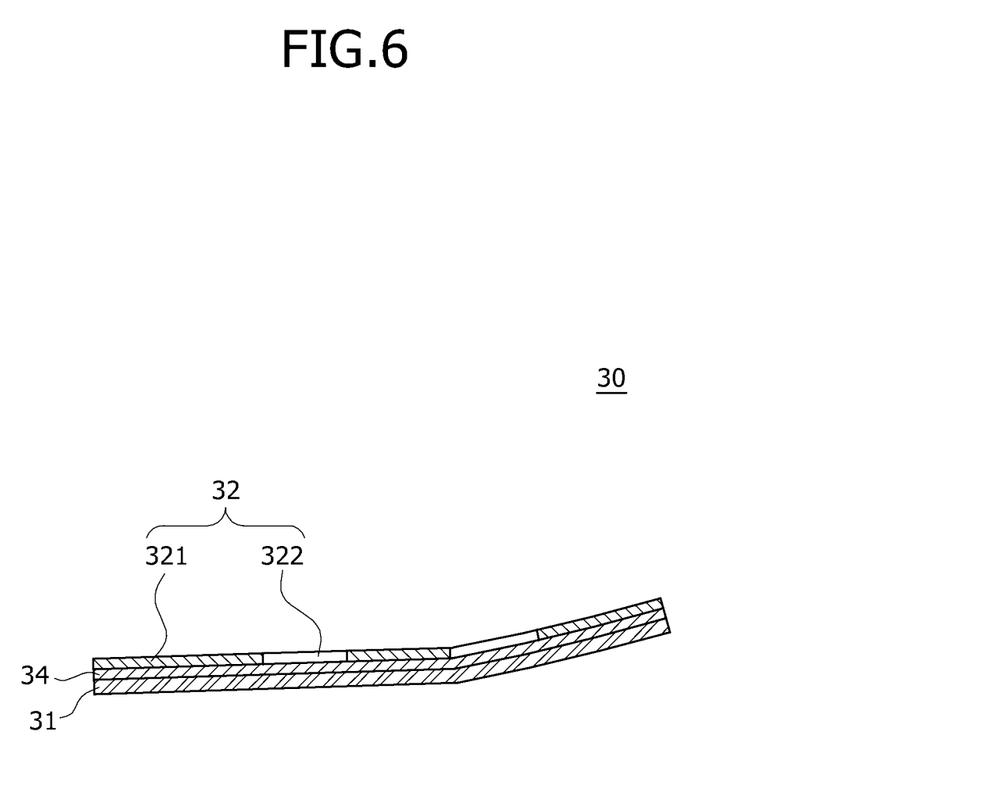
FIG. 6 is a diagram schematically illustrating a grill lens unit in accordance with a third embodiment of the present disclosure.

FIG. 6 is a diagram schematically illustrating the grill lens unit in accordance with a third embodiment of the present disclosure. Referring to FIGS. 5 and 6, the grill lens unit 30 may further include a fourth grill lens portion 34. The fourth grill lens portion 34 may be coated on the first grill lens portion 31, may transmit light, and may be formed to have a color corresponding to that of the center body unit 10. The fourth grill lens portion 34 may be coated on the inside of the first grill lens portion 31. When the second grill lens unit 32 has a bezel shape, the fourth grill lens portion 34 may be disposed between the second grill lens portion 32 and the first grill lens portion 31. In addition, the fourth grill lens portion 34 may be coated on the inside of the first grill lens portion 31, and the second grill lens portion 32 that blocks light may be partially coated on the fourth grill lens portion 34.

The operation of the lighting device for a vehicle in accordance with an embodiment of the present disclosure having the above structure will be described as follows.

The center body unit 10 is disposed at the central portion of the vehicle body 100, the driving lens unit 20 is disposed at the left and right edges of the vehicle body 100, and the grill lens unit 30 is disposed between the center body unit 10 and the driving lens unit 20. In such a case, the center body unit 10, the grill lens unit 30, and the driving lens unit 20 are sequentially disposed, and if necessary, the center body unit 10, the driving lens unit 20, and the grill lens unit 30 may be sequentially disposed. The light source unit 40 is disposed inside the traveling lens unit 20.

In the above state, when driving lighting is required according to a driver's operation signal or a sensed illuminance value, the light generation portion 41 is disposed to face the driving lens unit 20 and provides light.

On the other hand, when the light rotation portion 43 is driven by a driver's operation signal or during autonomous driving in order to communicate with other vehicles or pedestrians or communicate with a driver, the light generation portion 41 emits light toward the grill lens unit 30 while being rotated. In such a case, the light generated by the light generation portion 41 may transmit the driving lens unit 20 and provide grill lighting while passing through the grill lens unit 30.

In the lighting device 1 for a vehicle in accordance with an embodiment of the present disclosure, the light source unit 40 may selectively emit light to the driving lens unit 20 and the grill lens unit 30 disposed consecutively while being rotated, thereby providing driving lighting and grill lighting.

Although the present disclosure has been described with reference to the embodiments illustrated in the drawings, the embodiments of the disclosure are for illustrative purposes only, and those skilled in the art will appreciate that various modifications and other equivalent embodiments are possible from the embodiments. Thus, the true technical scope of the present disclosure should be defined by the following claims.

What is claimed is:

1. A lighting apparatus for a vehicle, the lighting apparatus comprising:
    a center body unit;
    a driving lens unit disposed on first and second sides of the center body unit and configured to provide driving lighting;
    a grill lens unit disposed between the center body unit and the driving lens unit and configured to provide grill lighting; and
    a light source unit configured to selectively emit light to the driving lens unit and the grill lens unit.

2. The lighting apparatus of claim 1, wherein the driving lens unit includes:
    a first driving lens portion exposed to the outside thereof; and
    a second driving lens portion configured to extend backward from the first driving lens portion to surround the light source unit, to transmit the light emitted from the light source unit, and to guide the light to the grill lens unit.

3. The lighting apparatus of claim 2, wherein the driving lens unit further includes:
    a third driving lens portion disposed inside the first driving lens portion and configured to prevent an inside of the first driving lens portion from being visible to the naked eye.

4. The lighting apparatus of claim 3, wherein the third driving lens portion includes an opaque material and is mounted or coated inside the first driving lens portion.

5. The lighting apparatus of claim 1, wherein the grill lens unit provides the grill lighting for communication in an autonomous driving mode of the vehicle.

6. The lighting apparatus of claim 1, wherein the grill lens unit provides motion lighting for welcome or goodbye to a driver.

7. The lighting apparatus of claim 1, wherein the grill lens unit includes:
    a first grill lens portion disposed between the center body unit and the driving lens unit to transmit light; and
    a second grill lens portion disposed inside the first grill lens portion and configured to allow a part of the light provided from the light source unit to pass therethrough.

8. The lighting apparatus of claim 7, wherein, in the second grill lens portion, a second blocking portion that blocks light in a left and right lateral direction and a second transmission portion that transmits light are alternately disposed.

9. The lighting apparatus of claim 7, wherein the grill lens unit further includes:
    a fourth grill lens portion coated on the first grill lens portion and configured to transmit light and to have a color corresponding to a color of the center body unit.

10. The lighting apparatus of claim 1, wherein the grill lens unit includes:
    a first grill lens portion disposed between the center body unit and the driving lens unit to transmit light; and
    a third grill lens portion disposed outside the first grill lens portion and configured to allow a part of the light transmitting the first grill lens portion to pass therethrough.

11. The lighting apparatus of claim 10, wherein, in the third grill lens portion, a third blocking portion that blocks light in a left and right lateral direction and a third transmission portion that transmits light are alternately disposed.

12. The lighting apparatus of claim 10, wherein the grill lens unit further includes:
    a fourth grill lens portion coated on the first grill lens portion and configured to transmit light and to have a color corresponding to a color of the center body unit.

13. The lighting apparatus of claim 1, wherein the light source unit includes:
    a light generation portion configured to generate the light when power is applied;
    a light connection portion coupled to the light generation portion; and
    a light rotation portion configured to rotate the light connection portion so that the light generation portion emits the light to the driving lens unit or emits the light to the grill lens unit.

14. The lighting apparatus of claim 13, wherein, in the light generation portion, a plurality of LED lamps are disposed vertically.

15. The lighting apparatus of claim 13, wherein, when the light generation portion is rotated to emit light to the driving lens unit by the light rotation portion, the driving lighting is provided.

16. The lighting apparatus of claim 13, wherein, when the light generation portion is rotated to emit light to the grill lens unit by the light rotation portion, the grill lighting is provided.

17. The lighting apparatus of claim 13, wherein the light source unit further includes:
    a light cover portion mounted outside the light generation portion and configured to prevent an inside of the first driving lens portion from being visible to the naked eye.

18. A lighting apparatus for a vehicle, the lighting apparatus comprising:
    a driving lens unit configured to provide driving lighting;
    a grill lens unit disposed adjacent to the driving lens unit and configured to provide grill lighting; and
    a light source unit configured to selectively emit light to the driving lens unit and the grill lens unit.

19. The lighting apparatus of claim 18, wherein the light source unit includes:
    a light generation portion configured to generate the light when power is applied;
    a light connection portion coupled to the light generation portion; and
    a light rotation portion configured to rotate the light connection portion so that the light generation portion emits the light to the driving lens unit or emits the light to the grill lens unit.

20. The lighting apparatus of claim 19, wherein the light source unit further includes:

a light cover portion mounted outside the light generation portion and configured to prevent an inside of the first driving lens portion from being visible to the naked eye.

\* \* \* \* \*